(12) United States Patent
Nishiyama

(10) Patent No.: US 7,837,342 B2
(45) Date of Patent: Nov. 23, 2010

(54) REFLEX REFLECTOR HAVING A PLURALITY OF INDICATING MEMBERS

(75) Inventor: Junji Nishiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 330 days.

(21) Appl. No.: 12/051,139

(22) Filed: Mar. 19, 2008

(65) Prior Publication Data

US 2008/0231954 A1 Sep. 25, 2008

(30) Foreign Application Priority Data

Mar. 20, 2007 (JP) .............................. 2007-072874

(51) Int. Cl.
*G02B 5/08* (2006.01)
*F21V 7/00* (2006.01)
(52) U.S. Cl. ....................... 359/850; 362/518
(58) Field of Classification Search .......... 359/591–596
See application file for complete search history.

(56) References Cited

U.S. PATENT DOCUMENTS

| | | | | |
|---|---|---|---|---|
| 2,763,187 A | * | 9/1956 | Wiener | 359/866 |
| 4,674,849 A | * | 6/1987 | Stewart | 359/850 |
| 5,128,839 A | * | 7/1992 | Kato | 362/521 |
| 6,540,202 B1 | | 4/2003 | Vecrin et al. | |
| 2003/0035298 A1 | * | 2/2003 | Amano | 362/518 |

* cited by examiner

*Primary Examiner*—Stephone B Allen
*Assistant Examiner*—Jade R Chwasz
(74) *Attorney, Agent, or Firm*—Kenealy Vaidya LLP

(57) ABSTRACT

A reflex reflector can include: a first indicator member including a plate-like first reflector with a reflex reflective surface and a first link plate, in which the first reflector and the first link plate are linked and arranged at a certain angle; and a second indicator member including a plate-like second reflector with a reflex reflective surface and a second link plate having an opening in which the first reflector and the first link plate are linked and arranged at the certain angle. The first reflector on the first indicator member fits in the opening through the second indicator member, and the at least one first reflector on the second indicator member superimposes on the first link plate of the first indicator member, such that the first indicator member and the second indicator member can be configured as a single piece.

18 Claims, 2 Drawing Sheets

REFLEX REFLECTOR HAVING A PLURALITY OF INDICATING MEMBERS

This application claims the priority benefit under 35 U.S.C. §119 of Japanese Patent Application No. 2007-072874 filed on Mar. 20, 2007, which is hereby incorporated in its entirety by reference.

BACKGROUND

1. Field

The disclosed subject matter relates to a reflector on a vehicle, referred to as a reflex reflector that can receive light from headlights (or other lights sources) from another oncoming vehicle (or other source) and correctly reflect the light in the direction from which the light was emitted, even when the reflector-mounted vehicle is at rest, that is, when the lights are all turned off. This reflector is effective to notify the driver of the oncoming vehicle of the presence of the vehicle at rest.

2. Description of the Related Art

A reflex reflector typically utilizes the property of three-face square mirrors combined together at right angles to reflect light from all of the mirrors such that light returns in substantially the same direction from which the light enters the reflex reflector. A general reflex reflector includes a number of elements each including the above three-face square mirrors, which are arranged in a plane to configure a one-face reflective surface.

In the design of a vehicle, however, for example, part of a light fixture, such as an outer lens may be formed with a curved surface. In this case, the position to which a conventional reflex reflector 90 is attached is not always flat. As exemplified in FIG. 3 in a cross-sectional view of a lens 80 with the reflex reflector 90 formed thereon, the reflex reflector may have a secondary curved surface. In response to this, methods of manufacturing the reflex reflector 90 with a curved reflective surface have been proposed as shown in FIGS. 4-5 (see, for example, U.S. Pat. No. 6,540,202).

As described above, one reflective surface on the reflex reflector 90 is formed as shown in FIG. 3. Namely, faces on the tip of a right hexagonal pin 91 are shaved two by two at a certain angle to the axis of the pin 91 such that the face tips meet at the center of the pin 91. The pin 91 thus formed has three orthogonal square faces, that is, a reflex reflective surface 92 on the pin tip. A certain number of these pins 91 are arranged (bundled) in parallel to configure an original of the one-face reflex reflector 90. A metal film is then laminated on the original by electroplating. Thereafter, the original is mold-released to obtain a molding part. This is the so-called electroforming method for obtaining a molding part having the reflex reflective surface.

Thereafter, the molding part of the reflex reflective surface is embedded in a mold of an outer lens as part thereof to complete a mold of the outer lens provided with the reflex reflective surface. The reflex reflector requires higher mold processing accuracy such as surface accuracy of the reflective surface and angular accuracy between faces. Therefore, the mold is not manufactured by machining such as numerical control (NC) machining, but rather multiface-structured pins are mainly combined together as described above to make the original of the reflex reflective surface. The mold thus obtained is used for molding a transparent resin to yield products.

As described above, the pin 91 has the reflex reflective surface 92 in the minimum unit on the tip. Accordingly, in order to arrange the reflex reflective surface 92 on a curved surface, for example, a dowel 93 having a certain length may be provided between the pins 91 as shown in FIG. 4. Alternatively, a shim 94 having a certain angle may be sandwiched between the pins 91 as shown in FIG. 5. Reference numeral 70 in FIG. 3 conceptually shows the state of two pins when the reflex reflective surface 92 is formed on the curved surface as described above.

In either of the methods of providing the dowel 93 between the pins or sandwiching the shim 94 between the pins as described above, a single pin 91 is around 2-3 mm in width at the opposite side of a hexagon. Accordingly, if the pin 91 is 2 mm and the reflex reflector 90 has an outer diameter of around 100 mm×50 mm, for example, the number of the pins 91 that are used reaches 1000 or more.

Namely, this means that dowels 93, for example, must be attached to many pins 91 as described above which involves a great deal of labor and time, etc. In addition, if the reflex reflective surfaces 92 provided on the associated pins 91 are not assembled at the same angle, variations may arise in the reflexive direction which can create problems. Thus, there is a need for high assembly accuracy, which results in a remarkable increase in cost, time, etc., without completely solving the problem.

If the entire reflex reflective surface is arranged and configured along the curved outer surface of the outer lens, the occurrence of the so-called undercut can not be avoided, which disables mold-releasing. In this case, a solution can be given with the use of a slide mold dividable into pieces that can be released in different directions. The divided portion in this type of mold, that is, the sliding surface of the slide mold suffers a strong frictional force. The molding part of the reflex reflective surface made through the above electroforming method is characteristically weak against the sliding friction. Accordingly, it is not preferable to apply this type of molding techniques on such a structure.

Therefore, if the reflex reflective surface is arranged along the curved surface, the divided portion in the mold is sometimes formed in different shape from the reflex reflective surface, and can be formed as a non-reflexive shape from the viewpoint of mold accuracy even if it is an analogous shape. In addition, the arrangement along the curved surface results in a continuously varying direction of reflexive reflection, which may not achieve a sufficiently effective reflection area depending on the direction of observation.

To solve the above problem, plural plate-like reflex reflectors are arranged along the curved outer lens in a corresponding method. In this case, however, an increase in the number of components causes increase in component costs, assembly costs and management costs. In addition, the above effective area may not be ensured. Thus, the arrangement of the reflex reflective surface along the curved outer lens causes a problem associated with the difficulty in configuring reflex reflective surfaces having a uniform reflexive reflection performance.

SUMMARY

The presently disclosed subject matter relates to a reflex reflector, that can include: a first indicator member composed of a light transmissive resin and including at least one, substantially plate-like first reflector with a reflex reflective surface formed thereon and at least one first link plate, in which the first reflector and the first link plate are linked and arranged at a certain angle; and a second indicator member composed of a light transmissive resin and including at least one, substantially plate-like second reflector with a reflex reflective surface formed thereon and at least one second link plate having an opening, in which the first reflector and the first link plate are linked and arranged at the certain angle, wherein the first reflector on the first indicator member fits in the opening through the second indicator member, and the at least one first reflector on the second indicator member superimposes on the first link plate in the first indicator member, such that the first indicator member and the second indicator member can be configured in or as a single piece.

In accordance with the present disclosed subject matter, plate-like reflex reflectors can be combined, for example, stepwise at a certain angle to eliminate the need for the use of dowels and shims in a mold for forming the reflex reflectors. This makes it possible to achieve a lowered cost based on the simplified manufacture of the mold and to substantially maintain the same performance as in the curved reflex reflector. Alternatively, the disclosed subject matter can eliminate the need for dividing the mold and introducing the slide mold and thus can simplify the mold production steps. In addition, it is effective to sufficiently ensure the effective area of reflection in a certain direction of observation.

According to another aspect of the disclosed subject matter, a reflex reflector, can include: a first indicator member including at least one first reflector portion with a reflex reflective surface formed thereon and extending in a first direction, and at least one first link portion extending from the first reflector portion at a certain angle greater than zero, the first indicator member having a longitudinal axis that extends along an entire longitudinal length of the first indicator member; and a second indicator member including at least one second link portion extending in the first direction, and at least one second reflector portion including a reflex reflective surface formed thereon and extending from the second link portion at the certain angle, the second indicator member having a second longitudinal axis that extends along an entire longitudinal length of the second indicator member, wherein the first reflector portion on the first indicator member extends from a first side of the second link portion to a second opposite side of the second link portion and through the second link portion of the second indicator member, and the at least one second reflector portion on the second indicator member extends adjacent and parallel to the first link portion of the first indicator member, such that a side portion of the first indicator member and a side portion of the second indicator member extend substantially parallel to each other along the entire longitudinal length of at least one of the first indicator member and second indicator member. It should be noted that the longitudinal length and longitudinal axis can extend along both the link and the reflector portions of each indicator member and from an outer perimeter side wall to an opposite outer perimeter side wall of the structures. Accordingly, in the embodiment shown in FIG. 1, the longitudinal axis can extend in an "S" or "Z" shaped manner in a left and right direction through the entire longitudinal (left to right in the figure) extent of the indicator members.

DETAILED DESCRIPTION OF EXEMPLARY EMBODIMENTS

Figure 1:
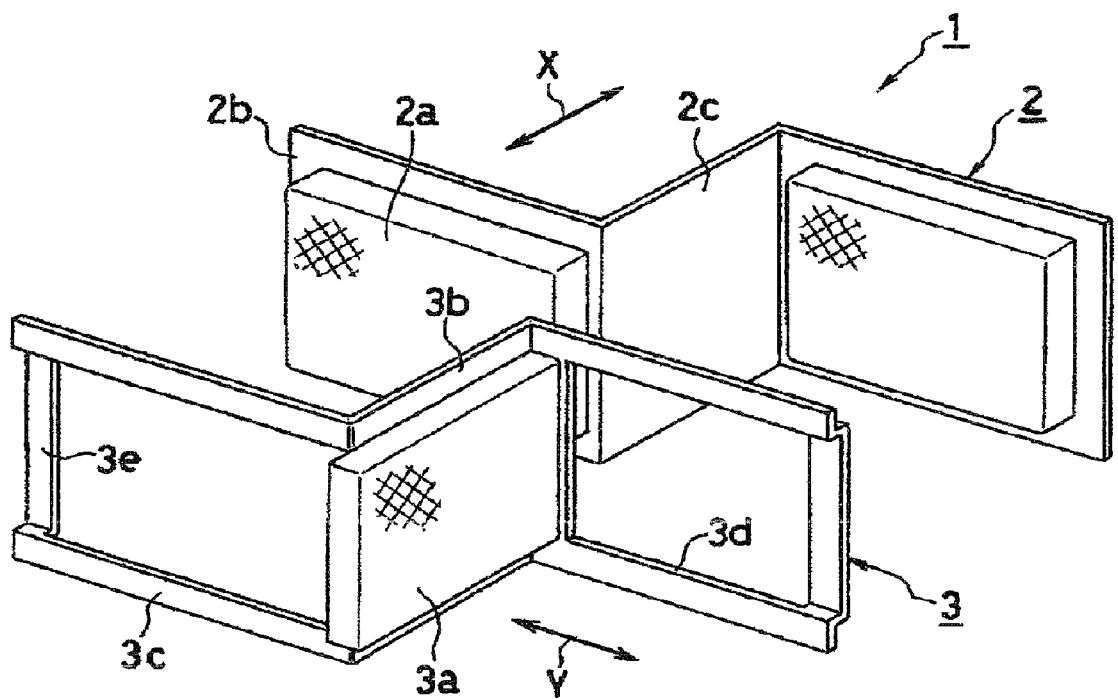
FIG. 1 is a perspective view showing an example of a reflex reflector made in accordance with principles of the present disclosed subject matter including a rear reflection assembly and a side reflection assembly before assembly.
Figure 2:
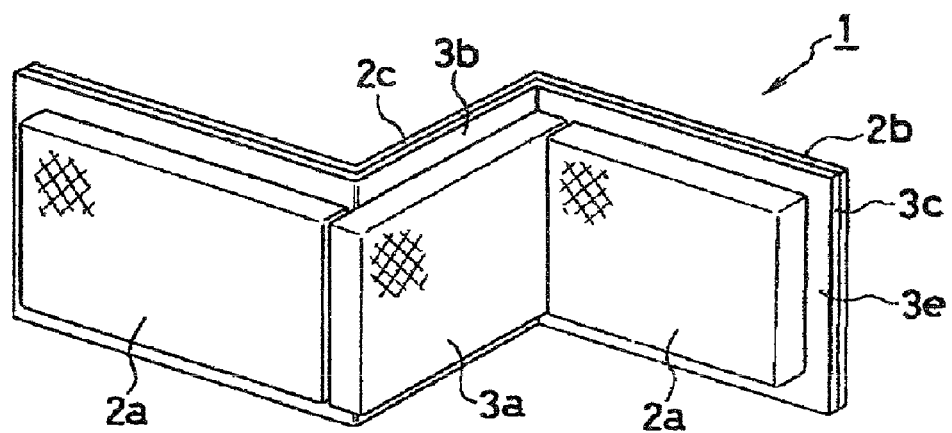
FIG. 2 is a perspective view showing the rear reflection assembly and the side reflection assembly of FIG. 1 after assembly.
Figure 3:
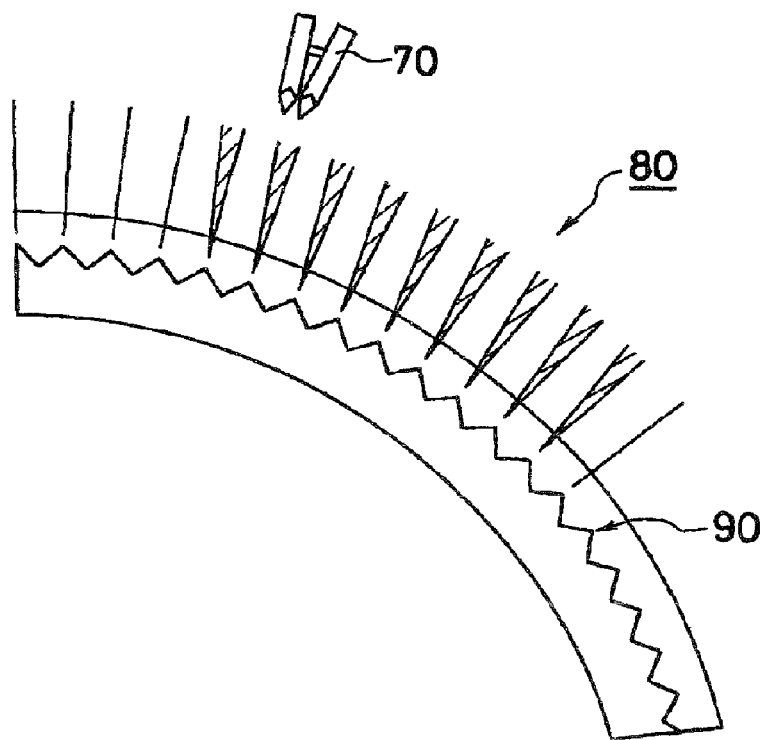
FIG. 3 is a top explanatory and illustrative view showing an example of a conventional reflex reflector provided on a curved lens surface.
Figure 4:
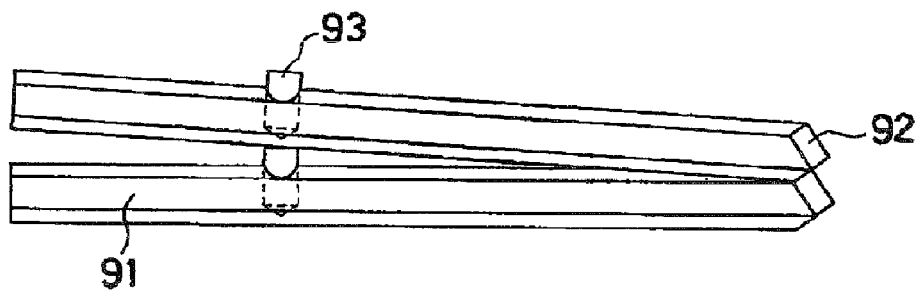
FIG. 4 is an illustrative view showing an example of pins with dowels to be provided on the curved lens surface in the conventional art.
Figure 5:
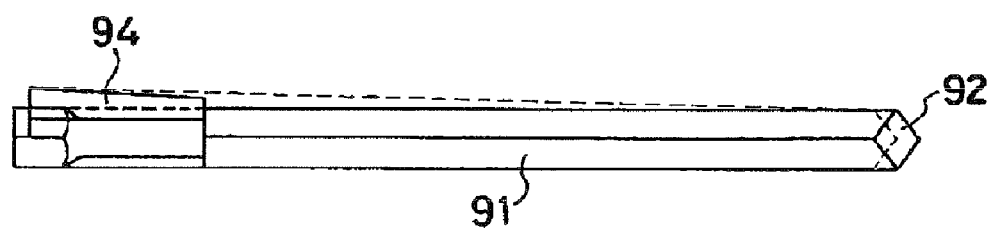
FIG. 5 is an illustrative view showing an example of pins with shims to be provided on the curved lens surface in the conventional art.

Examples of the presently disclosed subject matter will now be described based on the embodiments shown in the figures. In FIG. 1 the reference numeral 1 denotes a reflex reflector. The reflex reflector 1 can include at least two components: a first indicator member or rear reflection assembly 2 and a second indicator member or side reflection assembly 3 in combination. The first indicator member or rear reflection assembly 2 and the second indicator member or side reflection assembly 3 may be part of the taillight lens and therefore may be formed of a colorless transparent light transmissive material by means of injection molding.

First, the rear reflection assembly 2 includes plural rear reflex reflectors 2a, rear frames 2b provided integrally around the rear reflex reflectors 2a, and at least one rear link plate 2c arranged to connect between the rear frames 2b, for example, stepwise and at a certain angle. In this example, the rear frames 2b are shown as being connected almost orthogonal via the rear link plate 2c. The rear link plate 2c keeps plural rear reflex reflectors 2a almost in parallel. Namely, the rear reflex reflectors 2a on the first indicator member or rear reflection assembly 2 are arranged such that the reflectors substantially cause no positional superimposition of one on another when seen from the direction normal to the reflector (from along the X axis in FIG. 1). As long as such an arrangement can be kept, the certain angle between the rear frame 2b and the rear link plate 2c may be substantially a right angle or more.

FIG. 1 describes the use of only a single rear link plate 2c though the presently disclosed subject matter is not limited to the use of only the single rear link plate 2c. For example, more rear link plates 2c, rear frames 2b and rear reflex reflectors 2a may be connected stepwise in multiple stages.

In an aspect of the presently disclosed subject matter, the side reflection assembly 3 is used in association with the rear reflection assembly 2. The side reflection assembly 3 includes at least one side reflex reflector 3a, a side frame 3b provided near the rim of the side reflex reflector 3a, and plural side link plates 3c connected to both ends of the side frame 3b at a certain angle, for example, right angle, which are made substantially in the same form as the rear reflection assembly 2, such as a stepwise form. Namely, plural side link plates 3c in the second indicator member or side reflection assembly 3 are arranged such that the link plates substantially cause no positional superimposition of one on another when seen from a direction normal to the link plate. As long as this arrangement can be kept, the certain angle between the rear frame 2b and the rear link plate 2c can be substantially a right angle or more. The rear reflection assembly may have a shape that includes many more multiple stages than that shown in the figure.

In the side reflection assembly 3, the side link plate 3c can include an opening 3d formed therethrough. The opening 3d is sized such that it can receive therein the rear reflex reflector 2a which is integrally formed with the rear frame 2b in the rear reflection assembly 2. The side reflection assembly may also have a shape with more multiple stages than that shown in the figure, for example, a stepwise shape.

Some other embodiments different than the above embodiment are contemplated as follows. For example, the first indicator member or rear reflection assembly can include a single first reflector and a single link plate. The second indicator member or side reflection assembly can include a single link plate having an opening and two second reflectors linked to both ends of the plate. These members are structurally integrated such that the first reflector fits in the opening, and one of the second reflectors superimposes on the first link plate.

Alternatively, the first indicator member or rear reflection assembly can include a single first reflector and two link plates linked to both ends of the reflector. The second indicator member or side reflection assembly can include a single link plate having an opening and two second reflectors linked to both ends of the plate. These members are structurally integrated such that the first reflector fits in the opening, and the two second reflectors superimpose on the two first link plates.

The first indicator member can be integrated with the second indicator member to form the reflex reflector that has a circumference which may be fixedly fastened together. Alternatively, the outer member (second indicator member) may be attached to the body of the vehicle or the like to hold the inner member (first indicator member) immovable. In order to achieve such structures, various features and aspects can be taken in addition to the examples shown above.

The structure of the mold for use in formation of the rear reflection assembly 2 is considered herein. The rear reflection assembly 2 can be formed with only the operation of opening/closing the mold in the direction shown by the arrow X in the figure. At the same time, the use of pins without dowels and/or shims for the mold can be used for forming the rear reflex reflector 2a and for aligning axes of the pins in the X arrow direction thus making it possible to form the rear reflex reflector 2a.

The side reflection assembly 3 can also be formed using only the operation of opening/closing the mold in the direction shown by the Y arrow in the figure if the shape of an end portion 3e of the side link plate 3c forming the opening 3d is appropriately shaped. It can be formed without the use of a divided mold or a slide mold. Therefore, it is also possible to form the side reflex reflector 3a in the side reflection assembly 3 using pins without dowels and shims for the mold forming the side reflex reflector 3a and to align axes of the pins in the Y arrow direction.

With respect to the rear reflection assembly 2 and the side reflection assembly 3 configured as described above, the opening 3d in the side reflection assembly 3 can receive the rear reflex reflector 2a of the rear reflection assembly 2. In addition, the side reflex reflector 3a of the side reflection assembly 3 can superimpose on the link plate 2c of the rear reflection assembly 2 to form the reflector in a substantially stepwise fashion. In this case, the rear reflex reflector 2a of the rear reflection assembly 2 and the side reflex reflector 3a of the side reflection assembly 3 cause reflected lights in response to lights from 90°-different directions.

The taillights provided at the corners on both rear ends of a vehicle may partly include one reflex reflector (e.g. 2a) with the reflective surface directed toward the rear of the vehicle and the other reflex reflector (e.g. 3a) directed toward the side. In this case, reflected lights from all directions across the back surface and the side surface at the rear can be seen from other vehicles. It has been confirmed that a larger-area reflective surface can be obtained with such structures in comparison with the curved reflex reflector of the conventional art formed using pins with dowels or shims.

In accordance with the present disclosed subject matter, dowels and shims are not necessarily used with pins for mold production and the introduction of the slide mold is not executed. Instead, the reflex reflectors (2a, 3a) are combined alternately almost at right angles to exert the similar effect as the curved reflex reflector formed from the mold produced with the use of pins with dowels or shims. In accordance with the presently disclosed subject matter, it is possible to avoid the following disadvantages of the conventional art: extremely complicated production of pins; complicated assembling of molds due to pins that are not parallel and tightly in contact; increases in the number of steps in executing mold designs in accordance with mold dividing and introduction of slide molds; and increases in the number of work steps and increases in the number of management steps due to application of many components.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A reflex reflector, comprising:
a first indicator member composed of a light transmissive resin and including at least one substantially plate-like first reflector with a first reflex reflective surface formed thereon and at least one first link plate, in which the first reflector and the first link plate are linked and arranged at a certain angle greater than zero with respect to each other; and
a second indicator member composed of a light transmissive resin and including at least one substantially plate-like second reflector with a second reflex reflective surface formed thereon and at least one second link plate having an opening in which the second reflector and the second link plate are linked and arranged at the certain angle,
wherein the first reflector on the first indicator member is configured to extend through and is located in the opening through the second indicator member, and the at least one first reflector on the second indicator member is superimposed on the first link plate of the first indicator member, such that the first indicator member and the second indicator member are configured as a single piece, and
wherein the first reflector on the first indicator member and the second reflector on the second indicator member are combined stepwise at the certain angle with respect to each other.

2. The reflex reflector according to claim 1, wherein the first reflector on the first indicator member and the second reflector on the second indicator member exhibit a substantially stepwise shape when the first indicator member is integrated with the second indicator member.

3. The reflex reflector according to claim 1, wherein the first indicator member includes a plurality of first reflectors and the second indicator member includes a plurality of second reflectors.

4. The reflex reflector according to claim 3, wherein the certain angle is substantially a right angle or greater.

5. The reflex reflector according to claim 2, wherein the certain angle is substantially a right angle or greater.

6. The reflex reflector according to claim 1, wherein the certain angle is substantially a right angle or greater.

7. The reflex reflector according to claim 2, wherein the first indicator member includes a plurality of first reflectors and the second indicator member includes a plurality of second reflectors.

8. The reflex reflector according to claim 1, wherein the first indicator member is made from a single one piece continuous and homogenous material.

9. The reflex reflector according to claim 8, wherein the second indicator member is made from a single one piece continuous and homogenous material.

10. A reflex reflector, comprising:
a first indicator member including at least one first reflector portion with a first reflex reflective surface formed thereon and extending in a first direction, and at least one first link portion extending from the first reflector portion at a certain angle greater than zero, the first indicator member having a longitudinal axis that extends along an entire longitudinal length of the first indicator member; and
a second indicator member including at least one second link portion extending in the first direction, and at least one second reflector portion including a second reflex reflective surface formed thereon and extending from the second link portion at the certain angle, the second indicator member having a second longitudinal axis that extends along an entire longitudinal length of the second indicator member,
wherein the second reflector portion and the second link portion are linked and arranged at the certain angle,
wherein the first reflector portion on the first indicator member extends from a first side of the second link portion to a second opposite side of the second link portion and through the second link portion of the second indicator member, and the at least one second reflector portion on the second indicator member extends adjacent and parallel to the first link portion of the first indicator member, such that a side portion of the first indicator member and a side portion of the second indicator member extend substantially parallel to each other along the entire longitudinal length of at least one of the first indicator member and second indicator member, and
wherein the first reflector portion on the first indicator member and the second reflector portion on the second indicator member are combined stepwise at the certain angle with respect to each other.

11. The reflex reflector according to claim 10, wherein the first reflector portion on the first indicator member and the second reflector portion on the second indicator member exhibit a substantially stepwise shape when the first indicator member is integrated with the second indicator member.

12. The reflex reflector according to claim 10, wherein the first indicator member includes a plurality of first reflector portions and the second indicator member includes a plurality of second reflector portions.

13. The reflex reflector according to claim 12, wherein the certain angle is substantially a right angle or greater.

14. The reflex reflector according to claim 11, wherein the certain angle is substantially a right angle or greater.

15. The reflex reflector according to claim 10, wherein the certain angle is substantially a right angle or greater.

16. The reflex reflector according to claim 11, wherein the first indicator member includes a plurality of first reflector portions and the second indicator member includes a plurality of second reflector portions.

17. The reflex reflector according to claim 1, wherein the first indicator member is made from a single one piece continuous and homogenous material.

18. The reflex reflector according to claim 17, wherein the second indicator member is made from a single one piece continuous and homogenous material.

* * * * *